United States Patent
Hesselbrock et al.

(10) Patent No.: US 10,405,691 B2
(45) Date of Patent: Sep. 10, 2019

(54) APPARATUS FOR PREPARING BREWED BEVERAGES, AND A CAPSULE, CAPSULE SYSTEM AND METHOD FOR PRODUCING A BREWED BEVERAGE

(71) Applicant: MELITTA SINGLE PORTIONS GMBH & CO. KG, Minden (DE)

(72) Inventors: Katrin Hesselbrock, Osnabrueck (DE); Sven Neuhaus, Bad Oeynhausen (DE); Jan Pahnke, Minden (DE); Gerold Schandl, Minden (DE); Andreas Ebbecke, Hofheim (DE); Fabian Laasch, Bad Hauheim (DE); Thomas Weber, Mühltal (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 174 days.

(21) Appl. No.: 15/325,713

(22) PCT Filed: Jun. 3, 2015

(86) PCT No.: PCT/EP2015/062362
§ 371 (c)(1),
(2) Date: Jan. 11, 2017

(87) PCT Pub. No.: WO2016/005113
PCT Pub. Date: Jan. 14, 2016

(65) Prior Publication Data
US 2017/0181571 A1    Jun. 29, 2017

(30) Foreign Application Priority Data

Jul. 11, 2014 (DE) .......................... 10 2014 109 768

(51) Int. Cl.
*A47J 31/44* (2006.01)
*B65D 65/16* (2006.01)
(Continued)

(52) U.S. Cl.
CPC ....... *A47J 31/4492* (2013.01); *A47J 31/4403* (2013.01); *B65D 65/16* (2013.01); *B65D 85/8043* (2013.01); *G06K 7/10732* (2013.01)

(58) Field of Classification Search
CPC .. A47J 31/4492; A47J 31/3676; A47J 31/407; A47J 31/3623; A47J 31/0668;
(Continued)

(56) References Cited

U.S. PATENT DOCUMENTS 8,512,784 B2 * 8/2013 Denisart ................. A47J 31/22
426/433
2007/0245901 A1   10/2007 Blanc et al.
(Continued)

FOREIGN PATENT DOCUMENTS

DE     10 2006 004329 A1    8/2007
DE     20 2013 009 705 U1   1/2014
(Continued)

OTHER PUBLICATIONS

International Search Report for PCT/EP2015/062362, dated Aug. 19, 2015, and English Translation thereof.
(Continued)

*Primary Examiner* — Hong T Yoo
(74) *Attorney, Agent, or Firm* — Fisherbroyles, LLP; Robert Kinberg

(57) ABSTRACT

A brewing system includes a brewing apparatus and a capsule containing a substance for brewing. The capsule has an opening on one side and a base on an opposite side. The base includes a light input surface, a light-output surface and a light conductor to conduct light from the light input surface to the light output surface. The apparatus includes: a brewing chamber including an inlet for heated water, an outlet for the brewed beverage, and an opening in communication with the opening of the capsule. A light source on the
(Continued)

brewing apparatus emits light into the base via the light inlet surface of the capsule. The light conductor conducts the light to the light-output surface. A light detector of the brewing apparatus detects light emitted by light-output surface on the base of the capsule. A method of operating the brewing system and a capsule system are also described.

22 Claims, 7 Drawing Sheets

(51) Int. Cl.
    *B65D 85/804*     (2006.01)
    *G06K 7/10*     (2006.01)

(58) Field of Classification Search
    CPC ...... A47J 31/061; A47J 31/00; A47J 31/3642; A47J 31/3695
    See application file for complete search history.

(56) References Cited

U.S. PATENT DOCUMENTS

2008/0245236 A1    10/2008    Ternite et al.
2013/0064929 A1    3/2013    Jarisch et al.
2013/0114089 A1*    5/2013    Jarisch ................ A47J 31/0668
    356/614
2013/0129872 A1    5/2013    Kruger

FOREIGN PATENT DOCUMENTS

| EP | 1786303 B1 | 4/2008 |
| EP | 2159167 A1 | 3/2010 |
| JP | 2013-526316 A | 6/2013 |
| JP | 2013-533082 A | 8/2013 |
| WO | 2007/087890 A1 | 8/2007 |
| WO | WO-2010026053 A1 * | 3/2010 ............. A47J 31/22 |
| WO | 2016/005352 A1 | 1/2016 |

OTHER PUBLICATIONS

Written Opinion for PCT/EP2015/062362, dated Aug. 19, 2015, and English Translation thereof.
German Search Report for DE 10 2014 109 768.8, dated Mar. 3, 2015.
Singaporean Search Report for related SG Application No. 11201610805W, dated Aug. 7, 2017.
English Translation of German Search Report for DE 10 2014 109 768.8, dated Mar. 10, 2015.
Notice of Reasons for Refusal for Japanese Patent Application No. 2017-502719 dated Mar. 18, 2019.

* cited by examiner

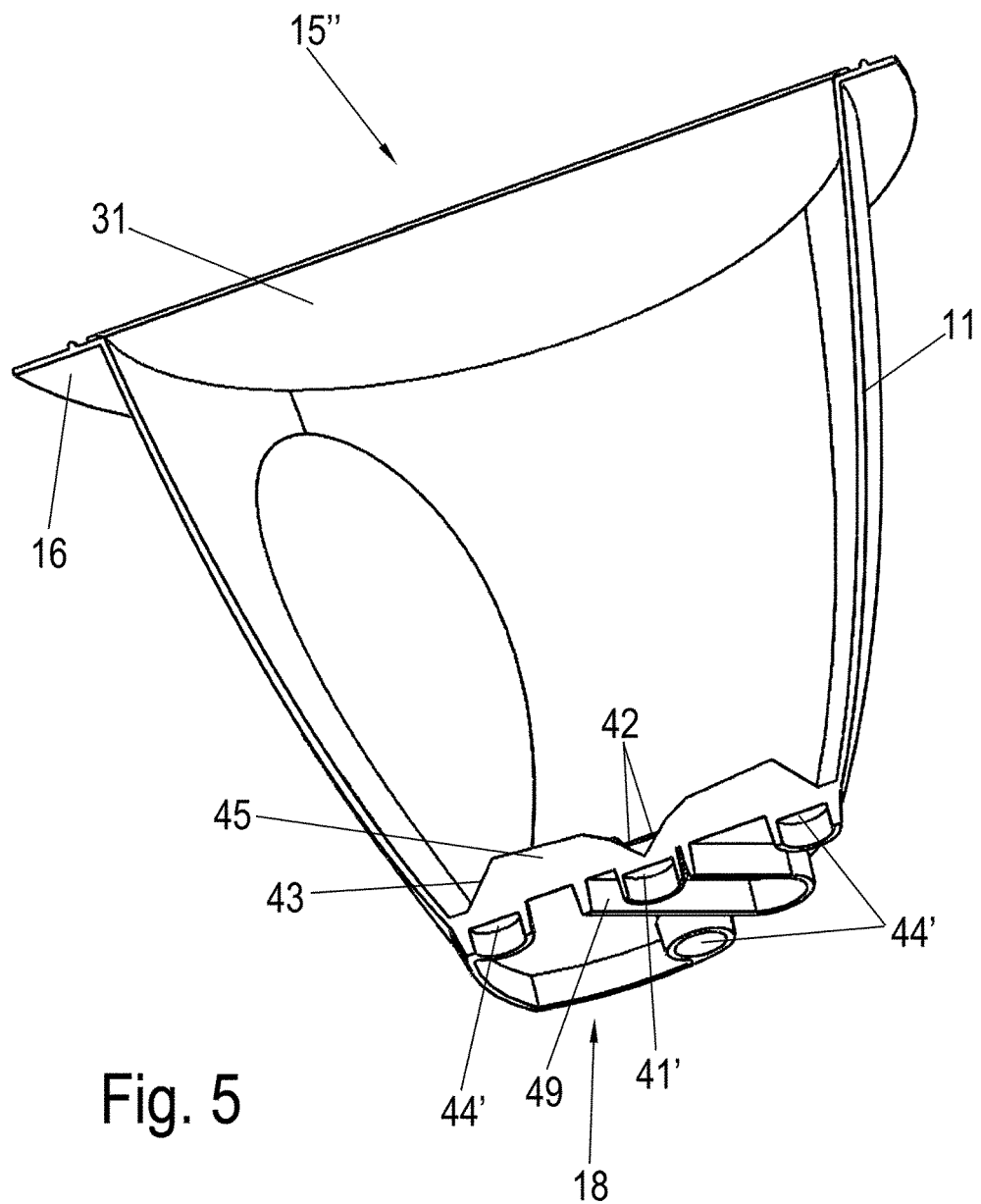

APPARATUS FOR PREPARING BREWED BEVERAGES, AND A CAPSULE, CAPSULE SYSTEM AND METHOD FOR PRODUCING A BREWED BEVERAGE

CROSS-REFERENCE TO RELATED APPLICATIONS

This application is a U.S. National Stage Application of International Patent Application No. PCT/EP2015/062362, filed Jun. 3, 2015, which claims benefit of German Patent Application No. 10 2014 109 768.8, filed Jul. 11, 2014.

TECHNICAL FIELD

The present invention relates to an apparatus for preparing brewed beverages, comprising a brewing chamber, on which an inlet is provided for heated water and an outlet for the brewed beverage, wherein the brewing chamber has an opening on which a capsule can be arranged with substances effective for the brewing operation, the capsule having a capsule opening which is connected at least in part to the brewing chamber and a base opposite the capsule opening, and to a capsule, a capsule system for the apparatus, and a method for producing a brewed beverage.

BACKGROUND OF THE INVENTION

EP 1 786 303 discloses an apparatus for preparing a beverage which comprises a detection device for recognising an identification marking on a portion package. The detection device is arranged on a sliding rail for guiding the portion package and carries out a colour recognition in that reflected light of a diode is detected. Such detection is susceptible to errors, especially when the package is soiled on the exterior side or the colours on the packages reflect light in a similar frequency spectrum.

WO 2007/087890 discloses a further apparatus for preparing hot beverages, in which a detection unit is provided for reading out a code provided on the cartridges. The detection unit comprises a radiation emitter and a radiation detector, wherein the radiation is guided through the edge of a cartridge. Means for coding are provided on the edge, so that recognition of the cartridge can occur. It is also disadvantageous in this recognition system that the edge of the cartridge is gripped during use for insertion of the cartridge and can therefore be soiled very easily. This can lead to errors in the recognition. Furthermore, the cartridge edge can also be slightly deformed or damaged.

SUMMARY OF THE INVENTION

It is therefore the object of the present invention to provide an apparatus for preparing brewed beverages which allow reliable recognition of coding on a capsule. Furthermore, a capsule shall be provided for such an apparatus and a capsule system.

This and other objects are achieved by a brewing system including an apparatus for preparing a brewed beverage and a capsule having an interior space for containing a substance effective for a brewing operation by the system, the capsule further comprising: a side having an opening and a base on a side opposite the side with the opening, the base including a light input surface, at least one light output surface and at least one light conductor to conduct light from the light input surface to the at least one light output surface, the capsule being adapted to be connected to a brewing chamber of the apparatus; and the apparatus comprising: a brewing chamber including an inlet for heated water, an outlet for the brewed beverage, and an opening in communication with the opening of the capsule when the capsule is connected to the brewing chamber; at least one light source arranged to be adjacent to the base of the capsule when the capsule is arranged on the brewing chamber, wherein the light source is operative to emit light into the base via the light inlet surface of the capsule, wherein the at least one light conductor on the base of the capsule conducts the light emitted into the base to the at least one light-output surface on the base of the capsule; and at least one light detector arranged opposite the at least one light-output surface of the capsule when the capsule is arranged on the brewing chamber, to detect light emitted by the at least one light-output surface on the base.

The object is also achieved by a capsule including an interior space for containing a substance effective for a brewing operation in an apparatus having a brewing chamber for brewing a beverage, the capsule, in one embodiment, further including: a side having an opening and a base on a side opposite the side with the opening, the base including a light inlet surface, at least one light output surface and at least one light conductor to conduct light from the light input surface to the at least one light output surface, wherein the capsule is adapted to be connected to the brewing chamber of the apparatus such that the opening on the side of the capsule is in communication with an opening in the brewing chamber of the apparatus.

The object is further achieved by a capsule system for a brewing system as above described wherein a plurality of capsules are provided in which at least one of the light-output surfaces and the light inlet surface of one capsule have different light transmission characteristics compared to the light-output surfaces and the light inlet surface of the other capsules in the plurality of capsules.

The object is further achieved by a method for preparing a brewed beverage, which in one embodiment, includes the following steps: providing a capsule containing a substance effective for a brewing operation in an apparatus having a brewing chamber for brewing a beverage, wherein the capsule has a base including a coding and at least one light conductor by which light emitted into the base is conducted to at least one light-output surface on the base; inserting the capsule into an insertion chute of the apparatus and arranging the capsule adjacent to the brewing chamber; arranging at least one light source adjacent to the base of the inserted capsule to emit light into the base of the capsule; reading out the coding on the base of the capsule with a light detector arranged opposite the at least one light-output surface; and filling hot water into the brewing chamber for preparing a brewed beverage depending on the coding read by the light detector.

At least one light source is provided in accordance with the invention for capsule recognition adjacent to the base of the capsule, which light source emits light into the base via an inlet surface, wherein at least one light conductor is provided in the base by means of which the light emitted into the base is conducted to at least one light-output surface on the base of the capsule, and a light detector is arranged opposite the at least one light-output surface. As a result, the function of capsule recognition can be shifted completely to the base of the capsule, which is far less susceptible to soiling than a protruding edge or any other exterior surface on the capsule, which is gripped during use and can be soiled. Furthermore, capsule recognition is reliable because detection occurs via light which is introduced into the base of the capsule and is output on at least one light-output surface. Light detectors can thus be used which are not susceptible to errors during detection, even in the case of minor soiling on the base.

According to a preferred embodiment of the invention, several light conductors are provided in the base into which light can be conducted from an inlet surface to a light-output surface on the base of the capsule. A light deflection apparatus can be provided in the base of the capsule adjacent to an inlet surface and/or a light-output surface. This allows recognising a capsule with only one light source and several light detectors or one light detector and several light sources.

For the purpose of an especially compact configuration, a first light deflection apparatus can be provided in each light conductor after the inlet surface and a further second light deflection apparatus before the light-output surface in order to emit the light from the light conductor to the light detectors. The light conductor can thus be arranged in a very flat way within the base so that the coding and the detection means do not disturb the user. The light can be emitted to the light detector substantially perpendicularly to a plane of the base, so that, originating from the light source, a deflection of the light occurs by approximately 180°, preferably in a range of between 140° and 220°. The light can be conducted within the base substantially parallel or at a slight angle of less than 30° relative to the plane of the base, so that the base is formed in a flat way. In addition, this arrangement allows that the light-emitting and light-receiving elements can be positioned adjacent to each other in one plane.

Four light conductors are preferably provided for recognition of different types of capsules, which conduct the light from an inlet surface to four light-output surfaces or from four inlet surfaces to one light-output surface.

For the purpose of secure recognition, the apparatus preferably comprises a positioning device which interacts with a positioning means of the capsule in order to arrange the capsule in a predetermined position and orientation on the brewing chamber. Capsule recognition then occurs in the position adjacent to the brewing chamber in order to process the information for the brewing process. The apparatus preferably comprises a controller for this purpose, which on the basis of the information of the light detectors controls parameters for the brewing process such as the brewing time, the temperature of the introduced water or further parameters.

In accordance with the invention, a capsule is also provided for an apparatus for preparing brewed beverages, which capsule comprises at least one light conductor on the base in order to conduct the light emitted by the apparatus to at least one light-output surface on the base of the capsule. This allows detection of the capsule in a manner which is not susceptible to disturbances. The capsule preferably has reduced transparency on at least one inlet surface and/or light-output surface. It can thus be detected for the coding on the light detector whether the light-output surface is transparent, transparent to a limited extent or not at all. A coating, a label, or a mechanical, thermal or chemical change made to the surface can be provided on at least one inlet surface and/or light-output surface for reducing the transparency. The light detector will then recognise that a cover is present on the light-output surface and thus no light is detected which is adequate for determining the type of capsule.

The light detector preferably measures the light intensity of the light emitted from the light-output surface, so that a decrease in the transparency can be obtained by a change in the region of the beam path of the light from the light source to the light detector. It is also possible to machine the light conductor to reduce transparency instead of the inlet surface and the light-output surface. For example, an incision or a groove can be introduced into the light conductor so as to disturb the beam path from the inlet surface to the light-output surface and thus obtain a coding of the capsule.

If four light-output surfaces are provided on the capsule, it is possible to recognise during capsule recognition on the light-output surface of four light conductors whether they are transparent or non-transparent. This allows providing a capsule system with 16 different types of capsules, which represents a sufficient spectrum for most brewed beverages.

The capsule is preferably formed in a substantially cup-shaped manner and comprises a capsule opening which is sealed by a screen or a filter element in a liquid-tight manner. Communication with an interior space of the brewing chamber can thus occur via the capsule opening, while capsule recognition occurs on the opposite side on the base.

In accordance with the invention, a capsule system is also provided for an apparatus in which several capsules are provided which are formed differently on the light-output surfaces.

In a method for producing a brewed beverage, a capsule is inserted at first into an insertion shaft and arranged adjacent to a brewing chamber. A coding on the capsule is then read out, wherein at least one light source is provided adjacent to a base of the capsule, which light source emits light into the base, wherein at least one light conductor is provided in the base by means of which the light emitted into the base is conducted to the at least one light-output surface on the base of the capsule and a light detector for reading out the coding is arranged opposite the at least one light-output surface. Hot water is then filled into the brewing chamber for producing a brewed beverage depending on the read-out coding.

Several light sources can preferably be provided in the method, which after the arrangement of the capsule adjacent to the brewing chamber subsequently emit light in a successive manner to different positions in the base and the emitted light is conducted to and detected by a single light detector. A coding can be read out by only one single light detector, wherein the introduction of light into the inlet surfaces on the base can occur in a time-staggered manner, so that a controller connected to the light detector knows which light conductor is currently queried by the introduction of light.

BRIEF DESCRIPTION OF THE DRAWINGS

The invention will be explained below in closer detail by reference to an embodiment shown in the enclosed drawings, wherein:

FIG. 5 shows a view of a further modified embodiment of a capsule.

DETAILED DESCRIPTION OF THE INVENTION

Figure 1:
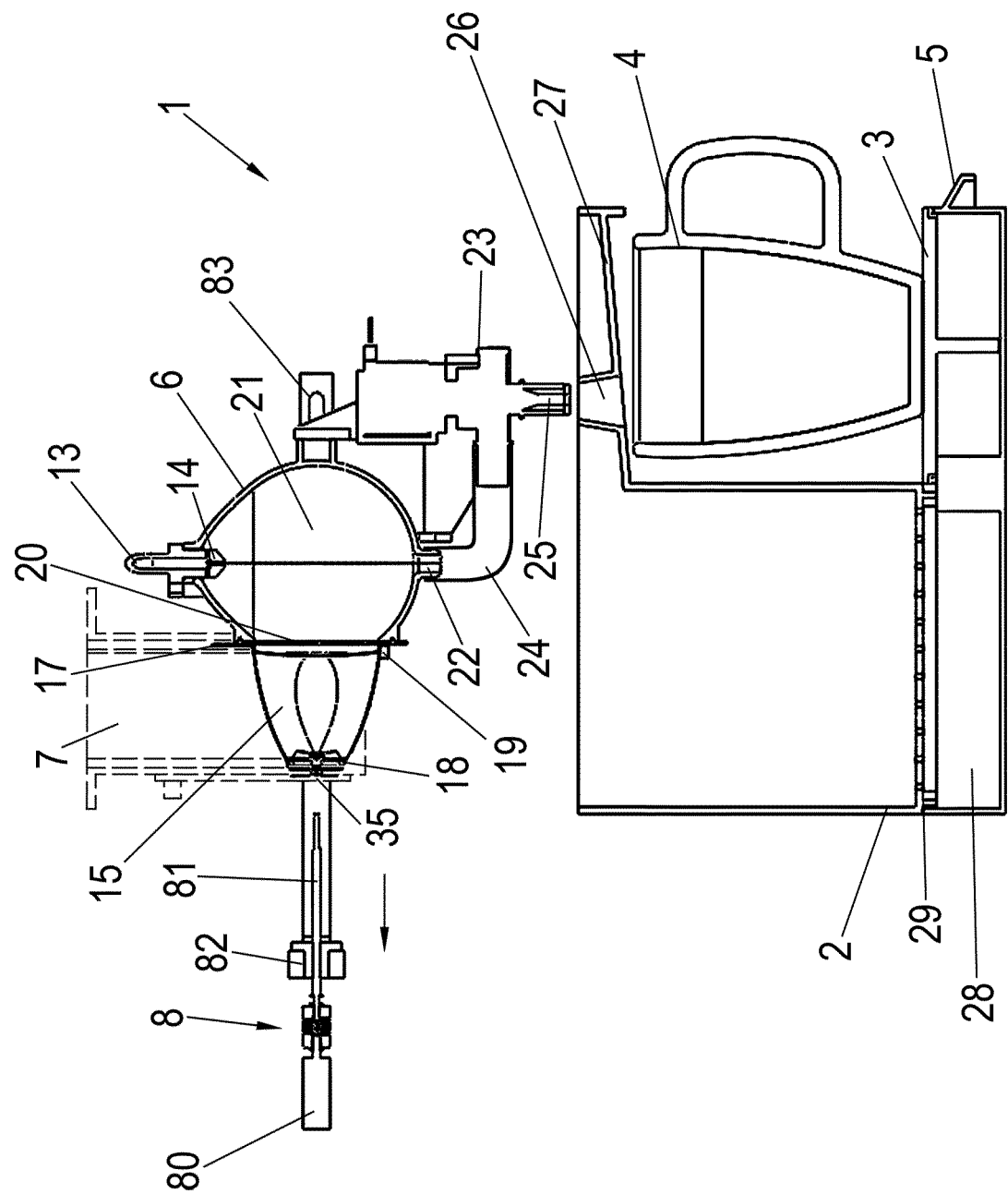
FIG. 1 shows a schematic view of an apparatus according to the invention for preparing brewed beverages.

An apparatus 1 for preparing brewed beverages comprises a removable collecting container 2 which is arranged in a housing. A support 3 with openings for depositing a vessel 4 is arranged on the collecting container 2. A gripping section 5 for pulling out the collecting container 2 is provided beneath the support 3.

The apparatus 1 for preparing brewed beverages further comprises a brewing chamber 6, which is provided adjacent to an insertion chute 7 for capsules.

As is shown in FIG. 1, the insertion chute 7 for capsules is disposed between the brewing chamber 6 and a drive device 8. The brewing chamber 6 can be moved relative to the insertion chute 7 via the drive device 8. An electric motor 80 is provided for this purpose, which drives a spindle 81 via a gear, on which spindle a spindle nut 82 is mounted in a torque-proof manner. Arms which are connected to the spindle nut 82 are displaced linearly along a guide 83 by rotation of the spindle 81. The arms engage around the brewing chamber 6 on opposite sides and can be move them linearly.

The apparatus 1 for preparing brewed beverages further comprises a tank (not shown) for freshwater, which can be formed in a removable manner. The tank is provided with a pump, by means of which water is conveyed to a heating device, which is connected to an inlet line 13 above the brewing chamber 6.

A capsule 15 is provided in the insertion chute 7, which capsule is formed in a cup-like manner and comprises an opening on one side which is sealed with a screen. The screen 31 is fixed to an edge 16 which is formed in an asymmetric manner and comprises a protruding section 17 on one side with a positioning means. The capsule 15 is thus inserted in a predetermined position and orientation into the insertion chute 7, which comprises a respective recess with guide means for the positioning of the capsule 15. On the side opposite the opening, the capsule 15 comprises a base 18 on which markings are arranged for identifying the capsule 15. By reading the coding of the capsule 15 on the apparatus, the filling quantity of hot water for the brewing chamber 6, the temperature and the dwell time can be set via a controller. The control of other parameters via the coding is also possible.

The capsule 15 is inserted at first into the insertion chute 7 for the brewing process. The capsule 15 slides downwardly until it is arranged at a lateral opening 20 of the brewing chamber 6. Retainers 19 are provided for this purpose on the exterior side of the brewing chamber 6, which retainers prevent that the capsule 15 slips out in the downward direction. FIG. 1 shows the brewing position to which the brewing chamber 6 is moved via the electric motor 80 after the insertion of the capsule 15, as shown by the arrow. A seal is thus pressed adjacent to the opening on the brewing chamber 6 against the edge 16 of capsule 15. The capsule 15 and an interior space 21 of the brewing chamber 6 thus form a unit, wherein the interior space 21 of the brewing chamber 6 and the interior of the capsule 15 are separated from each other by the screen 31. The interior space 21 of the brewing chamber 6 is several times larger than an interior space of the capsule 15, e.g. more than four times as large, so that the brewing beverage is mainly disposed in the brewing chamber 6 and only a minor portion in the capsule 15, which simplifies the dispensing of the brewing beverage.

In the brewing position, hot water is introduced via the inlet line 13 from the heating device 11 into the brewing chamber 6, for which purpose a nozzle 14 is provided at the end of the inlet line 13 which protrudes with a tip into the interior space 21 of the brewing chamber 6. The brewing chamber 6 without the capsule can accommodate a volume of between 0.1 l to 1.0 l, especially 0.15 l to 0.7 l, depending on the number of portions of the brewed beverage that need to be prepared simultaneously. The brewing chamber 6 comprises an outlet 22 at the bottom end, which outlet is connected via a line 24 to a valve 23. The introduced hot water is collected in the brewing chamber 6 by closing the valve 23 and rises over the outlet 22 in order to reach the material contained in the capsule 15 for brewing a beverage, especially tea. The preparation of the brewed beverage can be adjusted individually via the controller by previous reading of the coding on the capsule 15 via a reader device 35, e.g. green tea can be prepared differently than black tea, fruit tea or any other brewed or infusion beverage.

The valve 23 can be opened after the brewing process so that the brewed beverage flows from the brewing chamber 6 via the outlet 22 and the line 24 into an outlet nozzle 25, from where it is introduced into a vessel 4. A passage 26 or an opening is disposed between the outlet nozzle 25 and the vessel 4, so that the hot beverage can flow without obstruction into the vessel 4. The valve 23 can be closed again after the preparation of the brewed beverage.

After the brewing process, the brewing chamber 6 can be displaced via the drive device 8 away from the capsule 15 so that the capsule 15 is removed from the holding position adjacent to the lateral opening 20 on the brewing chamber 6 and drops in the downward direction. The capsule 15 drops into the collecting container 2 and onto a screen 29 or a grate which is arranged above a collecting basin 28. The displacement of the brewing chamber 6 simultaneously also displaces the line 24 and the outlet nozzle 25, which is now no longer arranged above the passage 26 but above a guide element 27. The brewing chamber 6 and all other lines wetted with tea can now be rinsed, in that hot water is injected from the heating device via the nozzle 14 into the brewing chamber 6, so that the hot water can remove residues of the brewing process. The hot water can be partly directly introduced through the opening 20 into the collecting container 2, and is introduced otherwise via the outlet 22 and the line 24 into the outlet nozzle 25. The rinsing water then reaches the guide element 27 from there, which is formed as a sloping surface above the vessel 4. The rinsing water reaches the collecting basin 28 of the collecting container 2 via the guide element 27. The guide element 27 can also be formed as a channel or a groove instead of a sloping surface.

Figure 2:
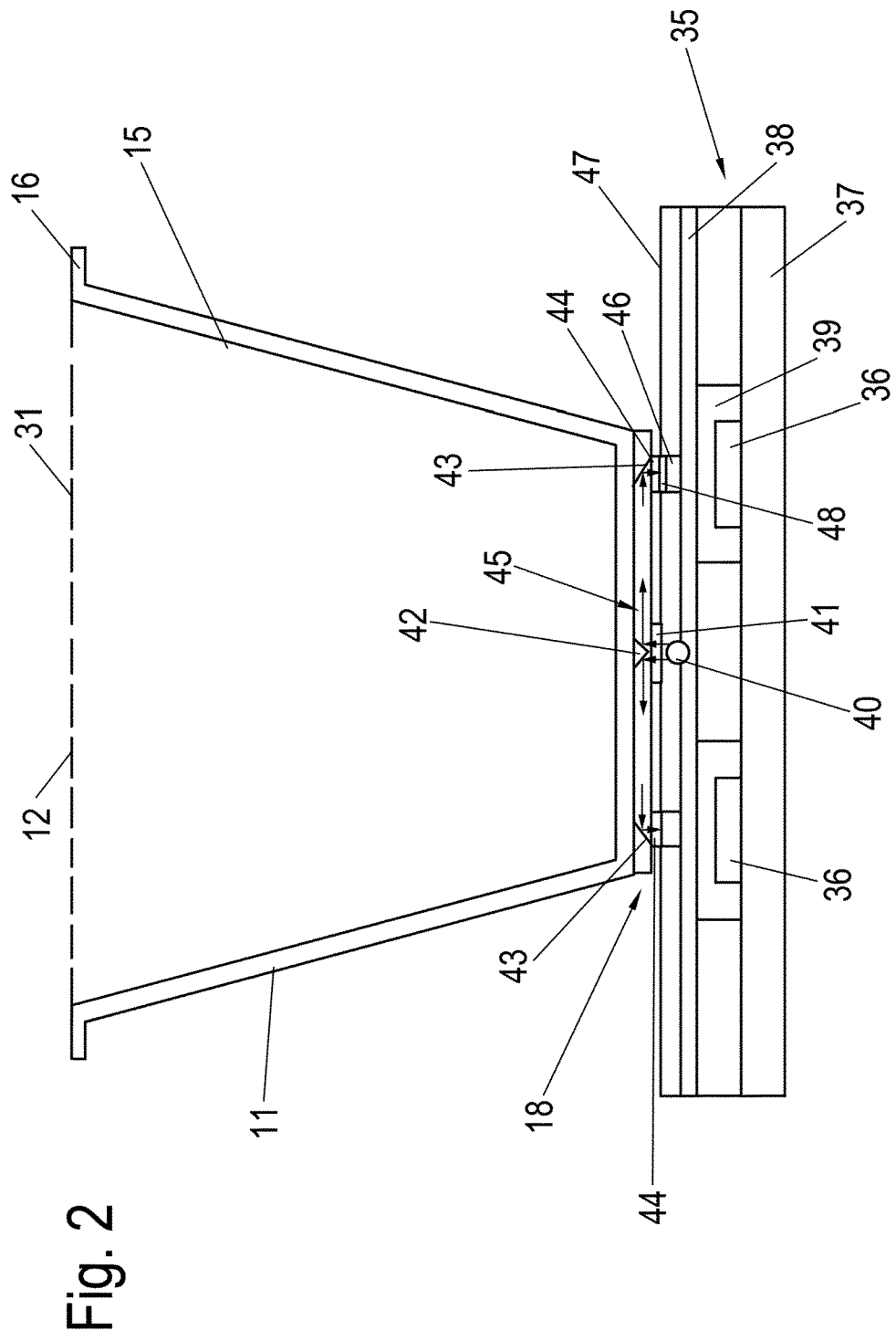
FIG. 2 shows a schematic view of the capsule recognition of the apparatus of FIG. 1.

FIG. 2 schematically shows a capsule 15 which is arranged on the reader device 35. The capsule 15 comprises an upper edge 16 on a side wall 11, on which a capsule opening 12 is provided. The capsule opening 12 is sealed by a screen 31, so that an extractable substance is unable to escape from the capsule 15.

A reader device 35 is provided on the base 18 on the side opposite the capsule opening 12. The reader device 35 comprises a light source 40, which is arranged centrally on the base 18. Light is injected from the light source 40 on an inlet surface 41 in the middle of the base 18, which light is distributed in light conductors 45. A first, centrally arranged light deflection apparatus 42 is provided for this purpose, by means of which the entering light beams, which impinge substantially perpendicularly to the plane of the base 18, are deflected at an approximately right angle and are guided through the light conductors. Several second light deflection apparatuses 43 are provided spaced from the first light deflection apparatus 42, which second light deflection apparatuses ensure that light from the first light deflection apparatus 42 is deflected and is guided to a light-output surface 44 on the base 18.

The light-output surface 44 is arranged opposite an opening 46 or a window on a diaphragm 47. The light reaches a light detector 36 of the reader device 35 through the opening 46. The light detector 36 is arranged in a protected manner behind a pane 38.

Several light-output surfaces 44 are provided on the base 18, preferably between two and eight light-output surfaces 44, especially four light-output surfaces 44, so that one light detector 36 is provided on the reader device 35 for each light-output surface 44. The light detectors 36 are retained on a support 37 and connected to a controller of the apparatus 1.

It is obviously also possible to provide four light sources instead of one light source 40, which light sources are arranged adjacent to the light-output surfaces 44. The light-output surfaces 44 then become light injection surfaces for the light and the centrally arranged inlet surface 44 becomes a light-output surface. It is then merely necessary to arrange a single light detector adjacent to the middle inlet surface 41, which then becomes a light-output surface. The beam direction of the light is reversed in this embodiment. The injection of light can occur in a time-staggered manner, so that readout of the individual light conductors 45 can occur separately.

If light is injected into the base 18 via the light source 40, a predetermined type of capsule can be recognised which is optionally formed in a transparent manner on the light-output surfaces 44 so that light reflected on the light detector 36 is detected, or the light-output surface 44 has a reduced transparency. A cover 48, a label, a coating or any other means can be provided for this purpose on the light-output surface 44 in order to reduce transparency. The surface can also be changed mechanically, thermally or chemically for this purpose, so that the adjacently arranged light detector 36 does not receive any reflected light.

It is also possible for reducing transparency to provide the light conductor with respective means, e.g. by one or several incisions. These means on the light conductor can also be used for encoding the capsule.

A specific type of capsule is thus recognised via the reader device 35, so that the temperature of the water to be introduced into the brewing chamber 6 and/or the brewing time or other parameters for the brewing process can be controlled. It may be useful for brewing green tea to set the brewing temperature to a lower level than in the case of black tea and to further reduce the infusion time. Optimised preparation can thus occur depending on the brewed beverage that is prepared, e.g. green tea, black tea, fruit tea, white tea or any other type of tea.

Figure 3A:
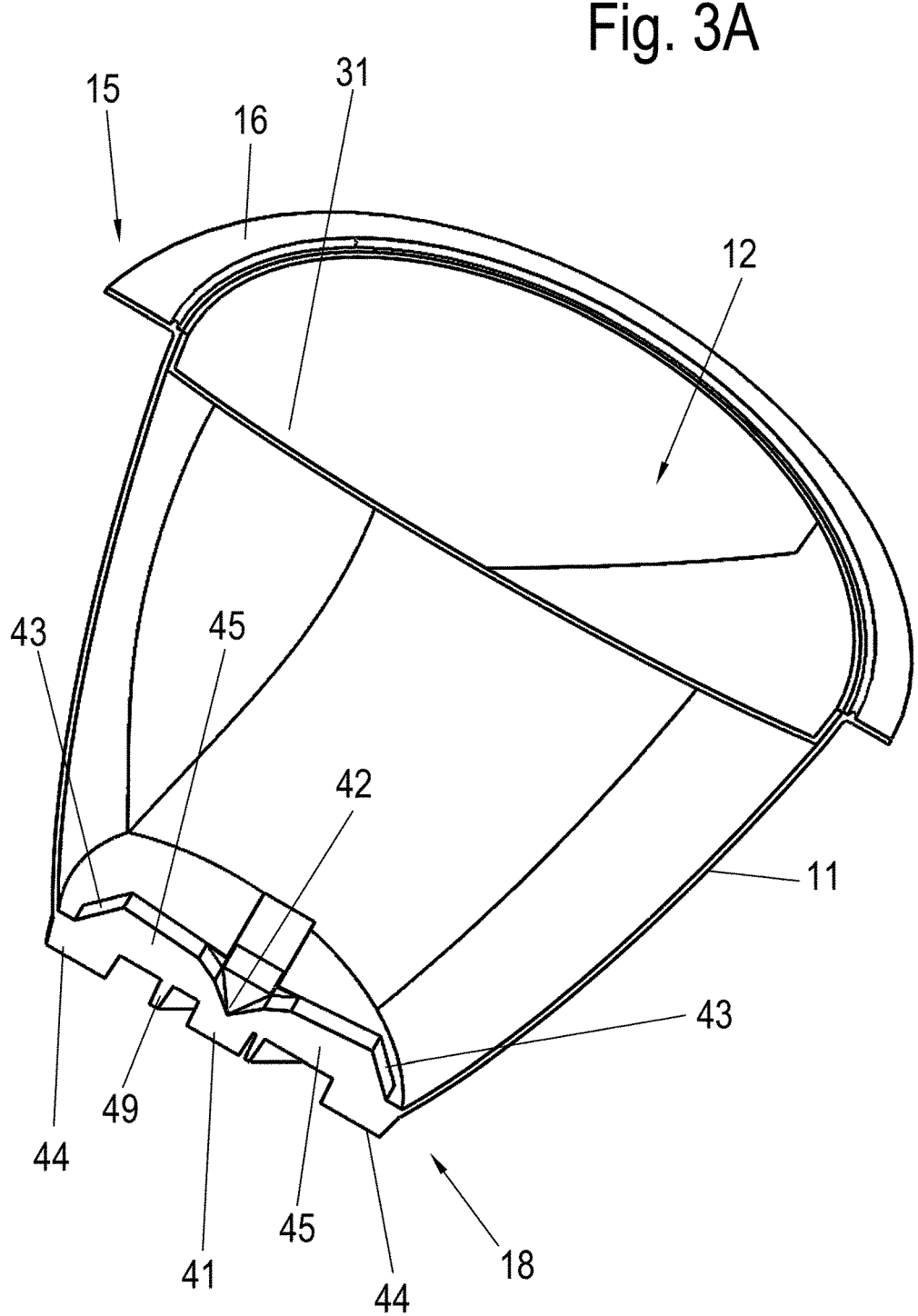
FIGS. 3A to 3C show several views of a capsule in accordance with the invention.
Figure 3B:
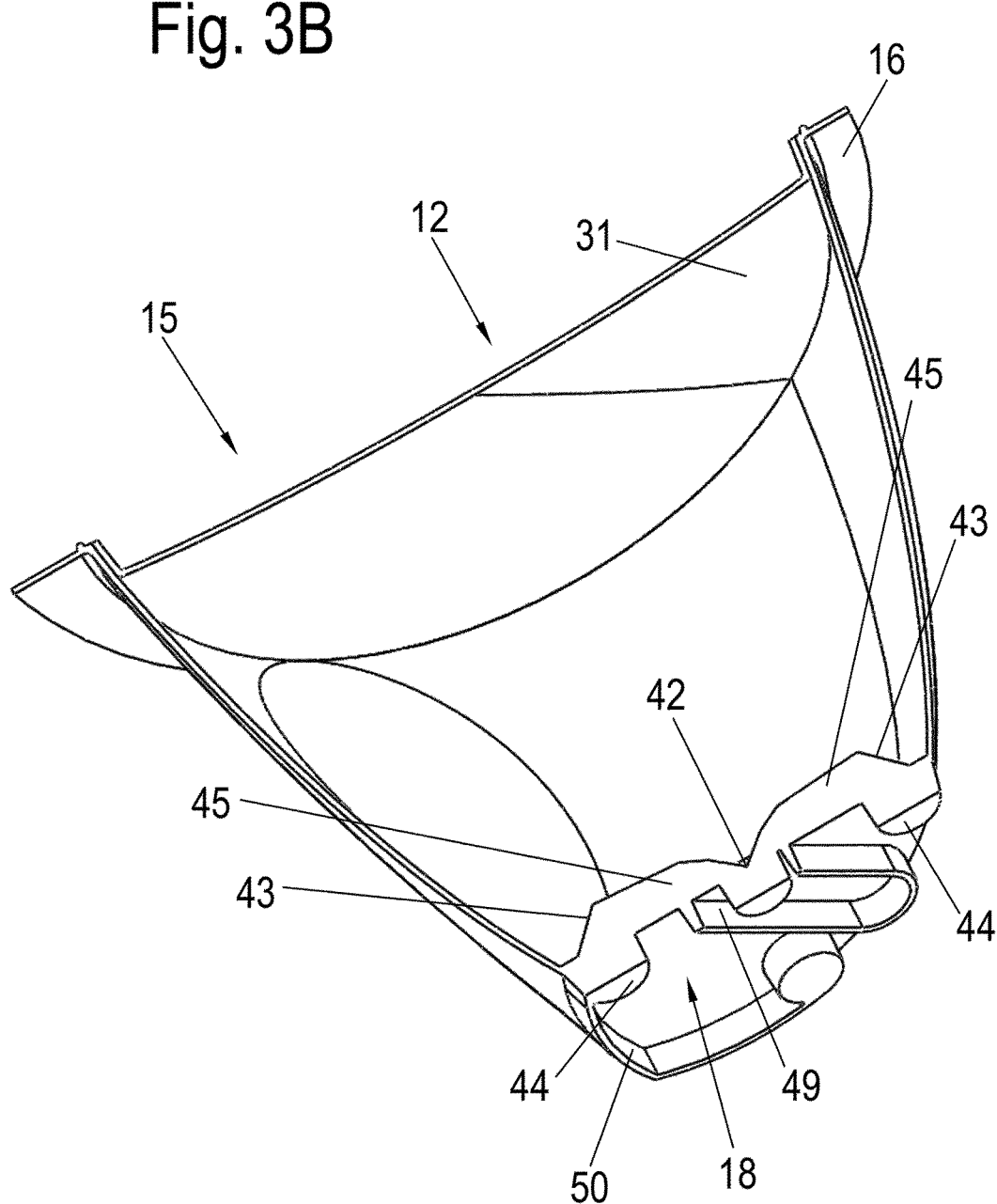
Figure 3C:
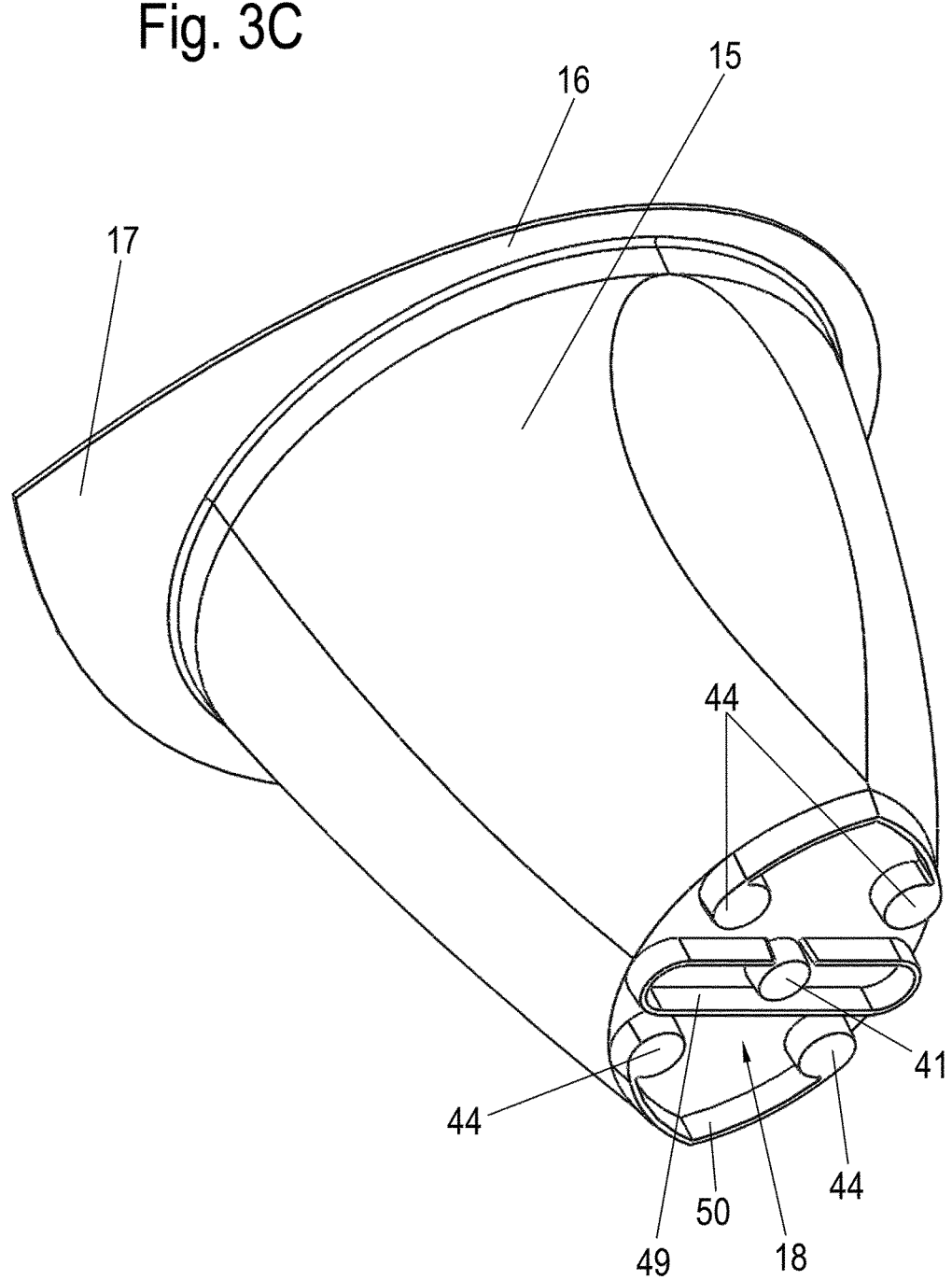

FIGS. 3A to 3C show a capsule 15 with a base 18 with light conductors 45. An inlet surface 41 is centrally arranged on the base 18, and light impinges on the first light deflection apparatus 42, wherein light is injected into four light conductors 45 which are arranged in a cross-shaped manner. Four second light deflection apparatuses 43 are provided at a predetermined distance from the first light deflection apparatus 42, which second light deflection apparatuses then emit light to four light-output surfaces 44.

The light conductors 45 are oriented substantially parallel to the plane of the base 18, which leads to a compact configuration. In the interior region, the base 18 is thus slightly uneven in the area of the light conductors 45, which has no disadvantageous effect on the brewing process. A cover can also be provided if necessary, so that a smooth inner base is provided on the capsule 15.

Four light-output surfaces 44 are provided in the illustrated embodiment, on which a respective light detector 36 detects or does not detect the emission of light. This leads to four types of coding on the base 18 of the capsule 15, so that 16 different types of capsules can be recognised. It is obviously also possible to vary the number of the light-output surfaces 44 and the light detectors 36. The light can be emitted substantially perpendicularly to a plane of the base 18 to the light detector, so that originating from the light source 40 a deflection of the light occurs about approximately 180°, preferably in a range of between 140° and 220°. The light can be conducted within the base substantially parallel or at a slight angle of less than 30° in relation to the plane of the base 18.

The light conductors 45 and the deflection apparatuses 42 and 43 can be made of transparent or translucent plastic or other suitable materials. The deflection apparatuses 42 and 43 can also be formed as mirror surfaces or reflective surfaces which deflect the impinging light in the direction.

The light conductors 45 can be made only of transparent or translucent plastic, but it is also possible to provide a sheath, preferably made of a reflecting material, in order to increase the light intensity at the light-output surface.

Instead of the illustrated four light-output surfaces 44, which are arranged in a centrosymmetric manner concentric to a central point of the base 18, other light-output surfaces can be provided, e.g. annular light-output surfaces, so that no alignment of the capsule 15 needs to occur when the capsule 15 is inserted into the insertion chute 7. In this case, the annular light-output surfaces can be used for recognising the type of capsule.

The capsule 15 comprises eccentric guide strips 49 on the base 18 and an outer edge 50, which interact with guide means on the insertion chute 7 in order to produce guidance and alignment of the capsule 15.

Figure 4:
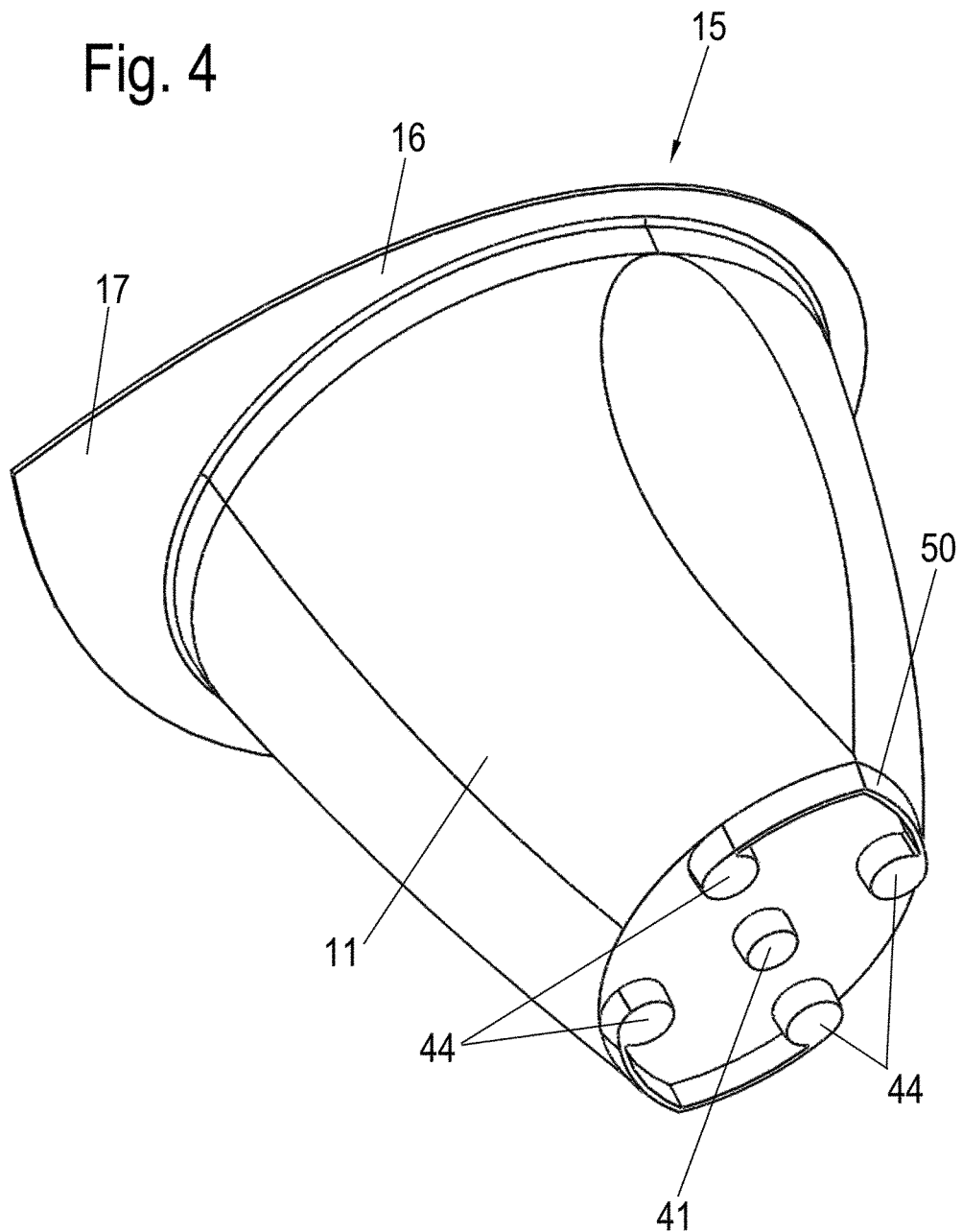
FIG. 4 shows a modified embodiment of a capsule.

FIG. 4 shows a modified capsule 15', in which no guide means 49 are provided on the base 18 but only the outer edge 50. Apart from that, the capsule 15' corresponds to the preceding embodiment.

FIG. 5 shows an embodiment of a capsule 15" which is modified over FIG. 3. A centrally arranged inlet surface 41' is disposed on the base 18, which inlet surface conducts light to the first light deflection apparatus 42 so that light is injected into four light conductors 45 which are arranged in a cross-shaped manner. Furthermore, four second light deflection apparatuses 43 are provided which then emit light to four light-output surfaces 44'. The light-output surfaces 44' and the one light injection surface 41' are each arranged in a protected manner in a cup-shaped receptacle. The light-output and light injection surfaces 44' and 41', which are oriented parallel to the surface of the base 18, are thus arranged in a protected manner by a downwardly protruding edge. The height of the preferably annular edge lies in a range of between 0.3 mm and 8 mm, especially 1 mm to 5 mm. Furthermore, a screen 31 is fixed to the upper edge 16 of the capsule 15".

LIST OF REFERENCE NUMERALS

1 Apparatus
2 Collecting container
3 Support
4 Vessel
5 Gripping section
6 Brewing chamber
7 Insertion chute
8 Drive device
11 Side wall
12 Capsule opening 13 Inlet line
14 Nozzle
15 Capsule
16 Edge
17 Section
18 Base
19 Retainer
20 Opening
21 Interior space
22 Outlet
23 Valve
24 Line
25 Outlet nozzle
26 Passage
27 Guide element
28 Collecting basin
29 Screen
31 Screen
32 Seal
33 Projection
35 Reader device
36 Light detector
37 Support
38 Pane
40 Light source
41 Inlet surface
42 Light deflection apparatus
43 Light deflection apparatus
44 Light-output surface
45 Light conductor
46 Opening
47 Diaphragm
48 Cover
49 Guide strips
50 Edge
50 Housing
80 Electric motor
81 Spindle
82 Spindle nut
83 Guide
84 Retainer

The invention claimed is:

1. A brewing system comprising an apparatus for preparing a brewed beverage and a capsule having an interior space for containing a substance effective for a brewing operation by the system,
the capsule further comprising:
a side having an opening and a base on a side opposite the side with the opening, the base including a light input surface, at least one light output surface and at least one light conductor to conduct light from the light input surface to the at least one light output surface, the capsule being adapted to be connected to a brewing chamber of the apparatus; and
the apparatus comprising:
a brewing chamber including an inlet for heated water, an outlet for the brewed beverage, and an opening in communication with the opening of the capsule when the capsule is connected to the brewing chamber;
at least one light source arranged to be adjacent to the base of the capsule when the capsule is arranged on the brewing chamber, wherein the light source is operative to emit light into the base via the light inlet surface of the capsule, wherein the at least one light conductor on the base of the capsule conducts the light emitted into the base to the at least one light-output surface on the base of the capsule; and
at least one light detector arranged opposite the at least one light-output surface of the capsule when the capsule is arranged on the brewing chamber, to detect light emitted by the at least one light-output surface on the base.

2. The system according to claim 1, wherein the at least one light-output surface on the base of the capsule comprises a plurality of light-output surfaces and the at least one light conductor comprises a plurality of light conductors wherein light is conducted from the light inlet surface to respective ones of the light-output surfaces on the base of the capsule.

3. The system according to claim 2, wherein the base of the capsule further includes at least one of (a) a light deflector adjacent to the light inlet surface and (b) a light deflector adjacent to at least one of the light-output surfaces, wherein light of the light source is introduced into one of the light conductors or is emitted by one of the light conductors to one of the light-output surfaces via a respective one of the light deflectors.

4. The system according to claim 2, wherein the plurality of light-output surfaces are operable as a plurality of light injection surfaces and the light input surface is operable as a common light output surface, and the plurality of light conductors comprises four light conductors which each lead from a respective one of the light injection surfaces to the common light-output surface.

5. The system according to claim 1, wherein the base of the capsule includes a first light deflector in each light conductor after the light inlet surface and a second light deflector in each light conductor before the respective light-output surface to emit light from the light conductor to the at least one light detector.

6. The system according to claim 5, wherein light is emitted to the at least one light detector substantially perpendicularly to a plane of the base.

7. The system according to claim 1, wherein the light inlet surface is a common light inlet surface, the at least one light-output surface on the base of the capsule comprises four light-output surfaces and the at least one light conductor comprises four light conductors which each lead from the common light inlet surface to a respective one of the four light-output surfaces.

8. The system according to claim 1, wherein the apparatus further comprises a positioning arrangement for the capsule and a retainer attached to the brewing chamber which interacts with the positioning arrangement to arrange the capsule in a predetermined position and orientation on the brewing chamber.

9. The system according to claim 1, wherein the apparatus further comprises a controller which receives information from the at least one light detector to control at least a brewing time and a temperature of the water introduced into the brewing chamber.

10. A method for preparing a brewed beverage employing the brewing system of claim 1, comprising the following steps:
providing the capsule with a substance effective for a brewing operation in the apparatus, wherein the base of the capsule includes a coding;
inserting the capsule into an insertion chute of the apparatus and arranging the capsule adjacent to the brewing chamber;
reading out the coding on the base of the capsule with the light detector arranged opposite the at least one light-output surface; and filling hot water into the brewing chamber for preparing a brewed beverage depending on the coding read by the light detector.

11. The method for preparing a brewed beverage according to claim 10, wherein the at least one light conductor of the providing step includes a plurality of light conductors, the at least one light source includes a plurality of light sources and further including arranging the plurality of light sources adjacent to the base of the inserted capsule; and after the arranging of the capsule adjacent to the brewing chamber, successively emitting light at different points into the base and conducting the emitted light by the plurality of light conductors to a single light detector for reading out the coding.

12. A capsule including an interior space for containing a substance effective for a brewing operation in an apparatus having a brewing chamber for brewing a beverage, the capsule further comprising:

a side having an opening and a base on a side opposite the side with the opening, the base including a light inlet surface, at least one light output surface and at least one light conductor to conduct light from the light inlet surface to the at least one light output surface, wherein the capsule is adapted to be connected to the brewing chamber of the apparatus such that the opening on the side of the capsule is in communication with an opening in the brewing chamber of the apparatus, and the light inlet surface of the base is arranged to receive light emitted into the base by a light source of the apparatus.

13. The capsule according to claim 12, wherein at least one of (a) the light inlet surface and (b) at least one of the light-output surfaces of the capsule has reduced transparency.

14. The capsule according to claim 13, wherein the at least one of the light-output surfaces includes a coating, a label or a mechanical, thermal or chemical change to effect the reduced transparency, or at least one of the light conductors includes a light-refractive element, to effect the reduced transparency.

15. The capsule according to claim 12, wherein the capsule is substantially cup-shaped and the capsule further includes a liquid-permeable screen or filter element sealing the opening of the capsule.

16. A capsule system for a brewing system, comprising a plurality of capsules each according to claim 12, wherein at least one of the light-output surfaces and the light inlet surface of one of the capsules in the plurality of capsules have different light transmission characteristics compared to the light-output surfaces and the light inlet surface of another of the capsules in the plurality of capsules.

17. The capsule according to claim 12, wherein the at least one light-output surface comprises a plurality of light-output surfaces and the at least one light conductor comprises a plurality of light conductors by which light is conducted from the light inlet surface to respective ones of the light-output surfaces on the base of the capsule.

18. The capsule according to claim 17, wherein the plurality of light-output surfaces are operable as a plurality of light injection surfaces and the light input surface is operable as a common light output surface, and the plurality of light conductors comprises four light conductors which each lead from a respective one of the light injection surfaces to the common light-output surface.

19. The capsule according to claim 12, wherein the base of the capsule further includes at least one of (a) a light deflector adjacent to the light inlet surface, and (b) a light deflector adjacent to at least one of the light-output surfaces, wherein light is introduced into one of the light conductors or is emitted by one of the light conductors to one of the light-output surfaces via a respective one of the light deflectors.

20. The capsule according to claim 12, wherein the base of the capsule includes a first light deflector in each light conductor after the light inlet surface and a second light deflector before the at least one light-output surface for emitting light from the at least one light-output surface when light is received by the light inlet surface.

21. The capsule according to claim 20, wherein light is emitted from the at least one light inlet surface substantially perpendicularly to a plane of the base.

22. The capsule according to claim 12, wherein the at least one light-output surface comprises four light-output surfaces and the at least one light conductor comprises four light conductors which each lead from a common light inlet surface to a respective one of the four light-output surfaces.

* * * * *